(12) United States Patent
McConnell et al.

(10) Patent No.: US 7,440,871 B2
(45) Date of Patent: Oct. 21, 2008

(54) METHOD AND SYSTEM FOR TRACKING AND REPORTING EMISSIONS

(75) Inventors: Robert McConnell, Shakopee, MN (US); Paul Hepperla, Carver, MN (US)

(73) Assignee: Verisae, Inc., Minneapolis, MN (US)

( * ) Notice: Subject to any disclaimer, the term of this patent is extended or adjusted under 35 U.S.C. 154(b) by 0 days.

(21) Appl. No.: 11/744,713

(22) Filed: May 4, 2007

(65) Prior Publication Data
US 2007/0260405 A1 Nov. 8, 2007

Related U.S. Application Data

(63) Continuation-in-part of application No. 11/423,860, filed on Jun. 13, 2006, now Pat. No. 7,369,968, which is a continuation-in-part of application No. 10/768,957, filed on Jan. 30, 2004, now Pat. No. 7,062,389, application No. 11/744,713, which is a continuation-in-part of application No. 10/429,619, filed on May 5, 2003.

(60) Provisional application No. 60/893,261, filed on Mar. 6, 2007, provisional application No. 60/444,091, filed on Jan. 31, 2003, provisional application No. 60/432,120, filed on Dec. 9, 2002.

(51) Int. Cl.
*G06F 17/00* (2006.01)
(52) U.S. Cl. ........................... 702/188; 705/500
(58) Field of Classification Search .......... 702/188, 702/182–185; 705/500, 412
See application file for complete search history.

(56) References Cited

U.S. PATENT DOCUMENTS

| 4,612,620 | A | 9/1986 | Davis et al. |
|---|---|---|---|
| 4,688,026 | A | 8/1987 | Scribner et al. |
| 4,755,957 | A | 7/1988 | White et al. |
| 4,989,141 | A | 1/1991 | Lyons et al. |
| 5,079,930 | A | 1/1992 | Beaverson et al. |
| 5,198,774 | A | 3/1993 | Williams, II et al. |
| 5,231,841 | A | 8/1993 | McClelland et al. |
| 5,434,775 | A | 7/1995 | Sims et al. |
| 5,537,313 | A | 7/1996 | Pirelli |
| 5,572,438 | A | 11/1996 | Ehlers et al. |
| 5,732,401 | A | 3/1998 | Conway |
| 5,748,956 | A | 5/1998 | Lafer et al. |
| 5,752,244 | A | 5/1998 | Rose et al. |

(Continued)

FOREIGN PATENT DOCUMENTS

EP 1566875 8/2005

(Continued)

OTHER PUBLICATIONS

Dilger, "Asset Management, maintenance redefined," Manufacturing Systems, Jul. 1997: 15(7); 122-128.

(Continued)

*Primary Examiner*—Edward Raymond
(74) *Attorney, Agent, or Firm*—Faegre & Benson LLP

(57) ABSTRACT

The present invention relates to methods and systems of tracking enterprise gas emissions such as greenhouse gas emissions. The systems and methods relate to collecting or entering data relating to one or more emissions source of an enterprise or an enterprise location, calculating emissions totals, and, according to certain embodiments, generating emissions reports.

31 Claims, 4 Drawing Sheets

U.S. PATENT DOCUMENTS

| | | |
|---|---|---|
| 5,758,126 A | 5/1998 | Daniels |
| 5,821,937 A | 10/1998 | Tonelli et al. |
| 5,831,610 A | 11/1998 | Tonelli et al. |
| 5,845,265 A | 12/1998 | Woolston |
| 5,859,778 A | 1/1999 | Kuroda et al. |
| 5,860,286 A | 1/1999 | Tulpule |
| 5,910,776 A | 6/1999 | Black |
| 5,918,207 A | 6/1999 | McGovern et al. |
| 5,923,850 A | 7/1999 | Barroux |
| 5,946,662 A | 8/1999 | Ettl et al. |
| 5,956,658 A | 9/1999 | McMahon |
| 5,980,090 A | 11/1999 | Royal, Jr. |
| 5,987,903 A | 11/1999 | Bathla |
| 5,996,889 A | 12/1999 | Fuchs et al. |
| 6,128,602 A | 10/2000 | Northington et al. |
| 6,154,738 A | 11/2000 | Call |
| 6,169,979 B1 | 1/2001 | Johnson |
| 6,211,782 B1 | 4/2001 | Sandelman et al. |
| 6,293,114 B1 | 9/2001 | Kamemoto |
| 6,298,333 B1 | 10/2001 | Manzi et al. |
| 6,385,510 B1 | 5/2002 | Hoog et al. |
| 6,430,542 B1 | 8/2002 | Moran |
| 6,437,692 B1 * | 8/2002 | Petite et al. ............... 340/540 |
| 6,650,346 B1 | 11/2003 | Jaeger et al. |
| 6,892,546 B2 | 5/2005 | Singh et al. |
| 6,952,680 B1 | 10/2005 | Melby et al. |
| 7,062,389 B2 | 6/2006 | Johnson et al. |
| 7,062,446 B1 | 6/2006 | Suhy, Jr. et al. |
| 7,142,949 B2 | 11/2006 | Brewster et al. |
| 7,149,701 B2 | 12/2006 | McKinney |
| 7,196,621 B2 | 3/2007 | Kochis |
| 7,259,675 B2 | 8/2007 | Baker et al. |
| 7,304,573 B2 | 12/2007 | Postma |
| 7,333,880 B2 | 2/2008 | Brewster et al. |
| 7,369,968 B2 | 5/2008 | Johnson et al. |
| 2001/0047383 A1 | 11/2001 | Dutta |
| 2002/0016757 A1 | 2/2002 | Johnson et al. |
| 2002/0059364 A1 | 5/2002 | Coulthard et al. |
| 2002/0070971 A1 | 6/2002 | Brown et al. |
| 2002/0138361 A1 | 9/2002 | Sy-Yuan |
| 2003/0154141 A1 | 8/2003 | Capazario et al. |
| 2004/0024662 A1 | 2/2004 | Gray et al. |
| 2004/0078306 A1 | 4/2004 | Whiteley et al. |
| 2004/0111697 A1 | 6/2004 | Johnson et al. |
| 2004/0162642 A1 | 8/2004 | Gasper et al. |
| 2004/0193449 A1 | 9/2004 | Wildman et al. |
| 2004/0225676 A1 | 11/2004 | Johnson et al. |
| 2005/0021710 A1 | 1/2005 | Johnson et al. |
| 2005/0086163 A1 | 4/2005 | Johnson et al. |
| 2005/0248454 A1 | 11/2005 | Hanson et al. |
| 2006/0170889 A1 | 8/2006 | Honda |
| 2006/0256308 A1 | 11/2006 | Honda |
| 2007/0043538 A1 | 2/2007 | Johnson et al. |
| 2007/0096899 A1 | 5/2007 | Johnson et al. |
| 2007/0268138 A1 | 11/2007 | Chung et al. |

FOREIGN PATENT DOCUMENTS

| | | |
|---|---|---|
| JP | 10340846 | 12/1998 |
| JP | 2004-301825 | 10/2004 |
| WO | 9941717 | 8/1999 |
| WO | 9966436 | 12/1999 |
| WO | 200017984 | 3/2000 |
| WO | 0197146 | 12/2001 |
| WO | 200207365 | 1/2002 |
| WO | 02090914 | 11/2002 |
| WO | 2005048328 | 5/2005 |
| WO | 2005062351 | 7/2005 |

OTHER PUBLICATIONS

"Equipment Containing Ozone Depleting Substances at Industrial Bakeries," EPA, Federal Register, Feb. 2002: 67(25): 5586-5595.

Pays, "An Intermediation and Payment System Technology," Fifth International World Wide Web Conference, May 6-10, Paris, France, 2004, 12 pp.

Johnson, "Developing an EPA Refrigerant Regulations Compliance Program," Environmental Support Solutions, Mesa, AZ, 1999, 6 pp., www.environ.com.

"Compliance Guidance for Industrial Process Refrigeration Leak Repair Regulations Under Section 608 of the Clean Air Act," Oct. 1995, The Chemical Manufacturer's Association and the Environmental Protection Agency, 59 pp.

Extended European Search Report from European patent application No. 07252399.6, dated Sep. 20, 2007, 7 pp.

International Search Report for published application No. WO2004053772 (PCT/US2003/039251), republished on Aug. 26, 2004, 3 pp.

International Preliminary Examination Report of international application No. PCT/US2003/039251, completed May 3, 2005, 9 pp.

Written Opinion of international application No. PCT/US2003/039251, mailed Sep. 15, 2004, 5 pp.

International Search Report, mailed Nov. 23, 2001, and Written Opinion, mailed Jun. 11, 2002, for international application No. PCT/US2001/019491, 9 pp.

International Search Report and Written Opinion for international application No. PCT/US2004/027165, filed Aug. 20, 2004, both mailed Feb. 21, 2005, 10 pp.

International Preliminary Examination Report for international application No. PCT/US2003/039517, filed Dec. 12, 2003, completed Mar. 29, 2005, 7 pp.

International Search Report, mailed Nov. 4, 2004, and Written Opinion, mailed Oct. 15, 2004, for international application No. PCT/US2003/039517, 13 pp.

International Preliminary Examination Report of international application No. PCT/US2001/019491, completed Dec. 1, 2002, 9 pp.

International Preliminary Examination Report (with written opinion) of international application No. PCT/US2004/027165, issued Feb. 21, 2006, 7 pp.

Terplan, "Web-based Systems 7 Network Management," CRC Press, pp. 1-43, 1999.

Air Force Refrigerant Management Program, Quinn Hart, manager, Refrigerant Management Handbook, Jun. 1994, 267 pp.

"Gas Protocol: A Corporate Accounting and Reporting Standard," World Resources Institute, 116pp. Published Mar. 2004.

* cited by examiner

METHOD AND SYSTEM FOR TRACKING AND REPORTING EMISSIONS

CROSS-REFERENCE TO RELATED APPLICATIONS

This application claims priority to U.S. Patent Application No. 60/893,261, filed Mar. 6, 2007, entitled "Emissions Tracking and Reporting," and further is a continuation-in-part of U.S. patent application Ser. No. 11/423,860, filed Jun. 13, 2006, entitled "Enterprise Energy Management System," which is a continuation-in-part of U.S. patent application Ser. No. 10/768,957, filed Jan. 30, 2004, entitled "Enterprise Energy Management System," which issued as U.S. Pat. No. 7,062,389 on Jun. 13, 2006, continuation-in-part of U.S. patent application Ser. No. 10/429,619, filed May 5, 2003, entitled "Refrigerant Loss Tracking and Repair," which claims priority to U.S. Patent Application 60/432,120, filed Dec. 9, 2002, entitled "Refrigerant Loss Tracking and Repair," both of which are hereby incorporated herein by reference in their entireties.

FIELD

This invention relates generally to a system and method for tracking greenhouse gas emissions, and further can relate to recording and/or reporting such emissions. According to one embodiment, the invention can also relate to tracking such emissions produced by an enterprise.

BACKGROUND

Gases that trap heat in the atmosphere are often called greenhouse gases (GHGs). GHGs are believed to be a significant contributor to the global warming phenomenon. Some GHGs such as carbon dioxide occur naturally and are emitted to the atmosphere through natural processes. Other GHGs are created and emitted solely through human activities. The principal GHGs that enter the atmosphere because of human activities are: carbon dioxide ($CO_2$), methane ($CH_4$), nitrous oxide ($N_2O$), and fluorinated gases such as hydrofluorocarbons, perfluorocarbons, and sulfur hexafluoride. In addition, GHGs can include at least some types of chlorinated gases.

Many governments are taking steps to reduce GHG emissions through national policies that include the introduction of emissions trading programs, voluntary programs, carbon or energy taxes, and regulations and standards on energy efficiency and emissions. As a result of such political and legislative initiatives in the United States and abroad, organizations are increasingly required to track and report their GHG emissions. Such emissions tracking and reporting can be arduous when it must be conducted for a multi-site organization or enterprise which exists across a wide geography. For example, a large retail chain may have hundreds of sites across the United States, with each site containing hundreds of sources of GHG emissions.

Accordingly, there is a need in the art for a system or method for expeditiously and efficiently tracking and reporting the GHG emissions.

BRIEF SUMMARY

Certain embodiments disclosed herein relate to a network based emissions tracking system comprising a first database and a server. The first database includes a plurality of characteristics relating to an enterprise's direct emission sources and indirect emission sources. The server includes software for tracking emissions of the direct emission sources and indirect emission sources based on the plurality of characteristics.

Another embodiment relates to a method of tracking an enterprise's emissions. The method includes maintaining at a first database a plurality of characteristics relating to the enterprise's direct emission sources and indirect emission sources and further includes tracking with software emissions of the direct emission sources and indirect emission sources based on the plurality of characteristics.

A further embodiment relates to a method of tracking and reporting amounts of greenhouse gas emissions produced by an enterprise. The method includes gathering data corresponding to each of an enterprise's emission sources, storing the data in a database, calculating the amount of green house gas emissions produced by each emission source, and generating an emissions report that comprises the amount of greenhouse gas emissions produced by a emission source or plurality of emission sources.

While multiple embodiments are disclosed, still other embodiments will become apparent to those skilled in the art from the following detailed description, which shows and describes illustrative embodiments of the invention. As will be realized, the invention is capable of modifications in various obvious aspects, all without departing from the spirit and scope of the inventions described herein. Accordingly, the drawings and detailed description are to be regarded as illustrative in nature and not restrictive.

DETAILED DESCRIPTION

The present invention relates to tracking emissions such as, for example, greenhouse gas ("GHG") emissions as defined above. Further, it is understood that the various systems and methods described herein can be used to track a wide variety of different types of emissions.

Figure 1:
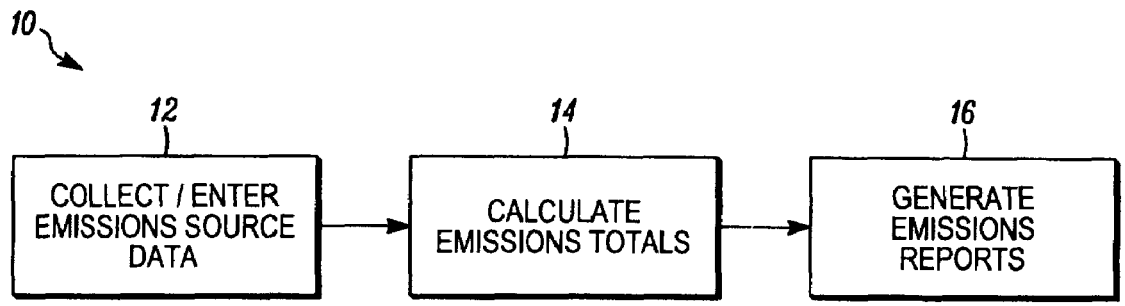
FIG. 1 is a flow chart illustrating the operation of a emissions tracking and reporting system in accordance with one embodiment.

FIG. 1 is a flow chart depicting the overall operation of a method and system for tracking emissions 10, according to one embodiment. The system generally comprises collecting data and/or entering data into the system relating to emissions sources (block 12), calculating emissions totals (block 14), and, according to certain alternative embodiments, generating emissions reports requested by a user on the basis of the stored emissions data (block 16). The system 10 can track the emissions of each source of interest. In one embodiment, system 10 tracks the emissions of each source at a particular location. Alternatively, the system 10 tracks the emissions of each emission source of each location of an enterprise. The system 10, in accordance with another aspect, can generate reports detailing the amount of emissions produced by an emission source or group of emission sources, particularly the amount of greenhouse gases produced by each source, and more particularly the amount of carbon dioxide and carbon dioxide equivalents produced.

In one embodiment, the system 10 tracks all types of emissions from all kinds of emission sources. For example, in one embodiment, emissions can include emissions that originate from both direct and indirect emission sources. Thus, in one embodiment, the system 10 tracks emissions from both direct and indirect sources. Alternatively, the system 10 can track solely the emissions from direct emission sources or solely the emissions from indirect emission sources.

Direct emission sources are those sources of emissions which are owned or controlled by the enterprise. Generally, direct emission sources comprise four subtypes: mobile combustion sources, stationary combustion sources, manufacturing process sources, and fugitive emission sources. For example, a vehicle or building heater would be a direct emission source.

In contrast, indirect emission sources include those sources which produce emissions, in whole or in part, as a result of the enterprise's activities, and are owned or controlled by another entity. Indirect emission sources include, for example, any energy or other GHG emitting sources that are imported from a third party, such as imported electricity, imported steam, imported heating, or imported cooling, all of which can also be referred to herein as "utilities." Imported electricity can include, but is not limited to, any electricity imported from one or more electric companies or other electricity providers. In one embodiment, imported electricity can include electricity from a co-generation plant, which is an engine or plant that simultaneously generates power and useful heat. Imported steam can include, but is not limited to, any steam imported from one or more steam providers or power plants. Imported heating can include, but is not limited to, any heat imported in any form from any heat provider. According to one implementation, imported heating can include steam or hot water imported from one or more heating providers. Imported cooling can include, but is not limited to, any cooling imported in any form from any cooling provider. In accordance with one aspect, imported cooling can include imported chilled water or other media for air conditioning or other uses from one or more cooling providers.

Returning to direct emission sources, the mobile combustion sources are those non-stationary assets of an enterprise that create emissions by means of fuel combustion, including, for example, automobiles, motorcycles, trucks, forklifts, boats, airplanes, construction equipment, and the like. The stationary combustion sources are those stationary assets of an enterprise that create emissions by means of fuel consumption, including, for example, power plants, refineries, furnaces, heaters, and the like.

The manufacturing process sources include an enterprise's manufacturing or industrial processes that result in release of emissions. These sources may include, for example, the manufacturing of aluminum, iron, steel, refrigerants, ammonia, acids, and lime. The fugitive emissions sources include the assets of an enterprise that cause emissions to be released by means of unintentional release or leak, such as is common in air conditioning and refrigeration equipment, for example.

While specific examples of emission sources for each emission type and subtype have been provided, the methods and systems discussed herein anticipate the tracking of any type of emission from any emission source.

As an initial procedure according to one embodiment prior to collection of emissions information (block 12), the emission sources of an enterprise to be monitored may be inventoried and an emission source identifier created for each emission source to give it a trackable identity. According to one embodiment, this approach provides a uniform naming convention, such that the same emissions source is identified by the same name or identification number each time it is entered into the system. In another embodiment, a set of appropriate data fields is associated with each emissions source wherein each field has a set of acceptable attributes. In this fashion, certain information specific to certain types of emissions sources can be collected and, according to certain embodiments, only that appropriate information can be entered into the system.

Once an identifier and data fields have been created for each emissions source, emissions information relating to each source can be collected (block 12). That is, certain characteristics or information of each trackable emissions source may be associated with the identifier.

The information collected (block 12) for an emission source may vary depending on the type or category of emission source. For example, the emission sources may be placed into two categories: direct emissions and indirect emissions (as described above). Alternatively, the direct emissions sources may be further placed into four subcategories based on the four subtypes described above. Depending on the category and/or subcategory of a source, the type of information collected, and thus the fields for which information may be collected, may differ. For example, the emission source information may include any emission source identifying information such as the emission source identifier and type and/or subtype of the emission source. In addition, the emission source information may include historical emissions data for the source (also referred to as "legacy" data). Additionally, the information may include site information relating to all of the sites where the enterprise has emission sources, including site location, identification of emission sources at the site, and any other relevant site information. If the emission source is one part of a system or group comprised of more than one emission source, in some embodiments, the emission source information may include group information, including the group name, description of the group, identification of the emission sources in the group, along with any other relevant information. A group may comprise, for example, all of the emission sources at a particular site location. Additionally, for example, a group may comprise all of the emission sources of an enterprise.

Figure 2:
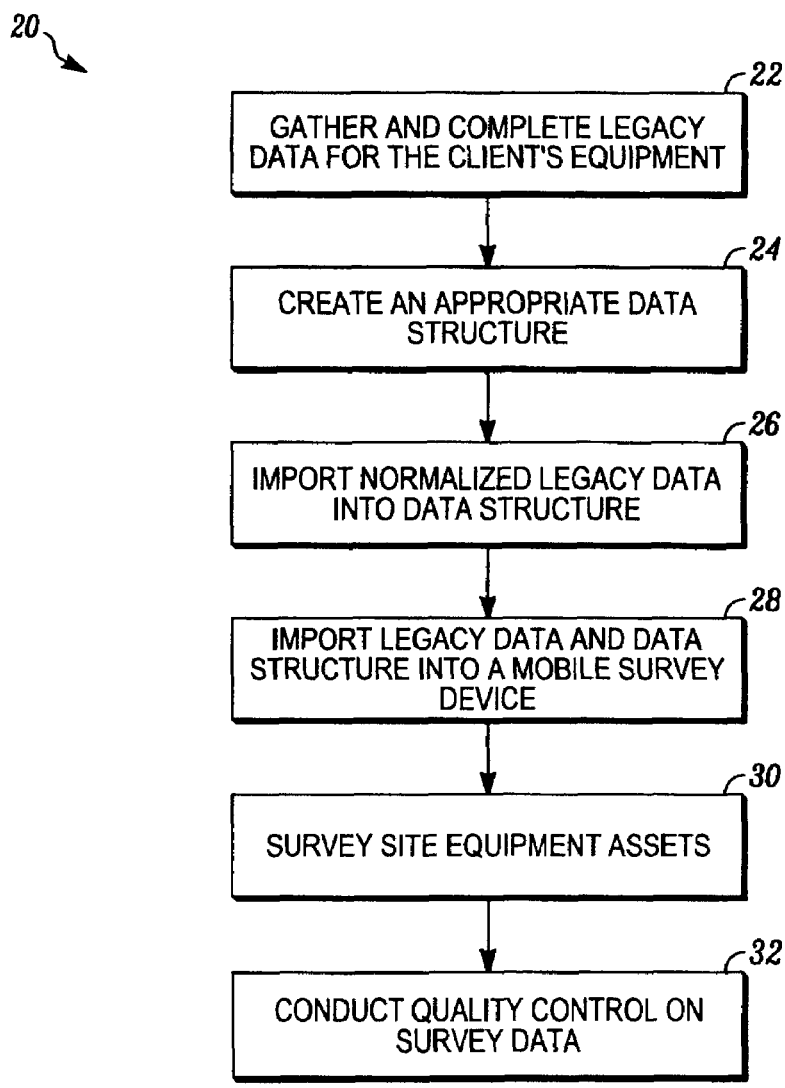
FIG. 2 is a flow chart depicting a method of organizing and collecting emissions data, according to one embodiment.

According to one embodiment, the process of collecting and storing information (block 12) relating to emission sources located at a site is implemented using or in conjunction with a method or system for surveying equipment assets located at a site or at multiple distributed sites. One example of such a system is disclosed in co-pending U.S. patent application Ser. No. 10/771,090, entitled "Site Equipment Survey Tool," filed on Feb. 3, 2004, which is incorporated herein by reference in its entirety. FIG. 2 is a flow chart showing an equipment surveying method 20 that allow for surveying equipment, including emissions sources, according to one embodiment. As shown in FIG. 2, the surveying method 20 includes gathering and compiling legacy data for a client's equipment assets, including the emissions sources (block 22), creating an appropriate data structure for collecting and storing equipment information (block 24), importing normalized legacy data into the data structure (block 26), importing the data structure and the legacy data (block 28), and surveying site equipment assets to collect relevant information (block 30). In one embodiment, a quality control review is conducted on the collected survey data (block 32).

Figure 3:
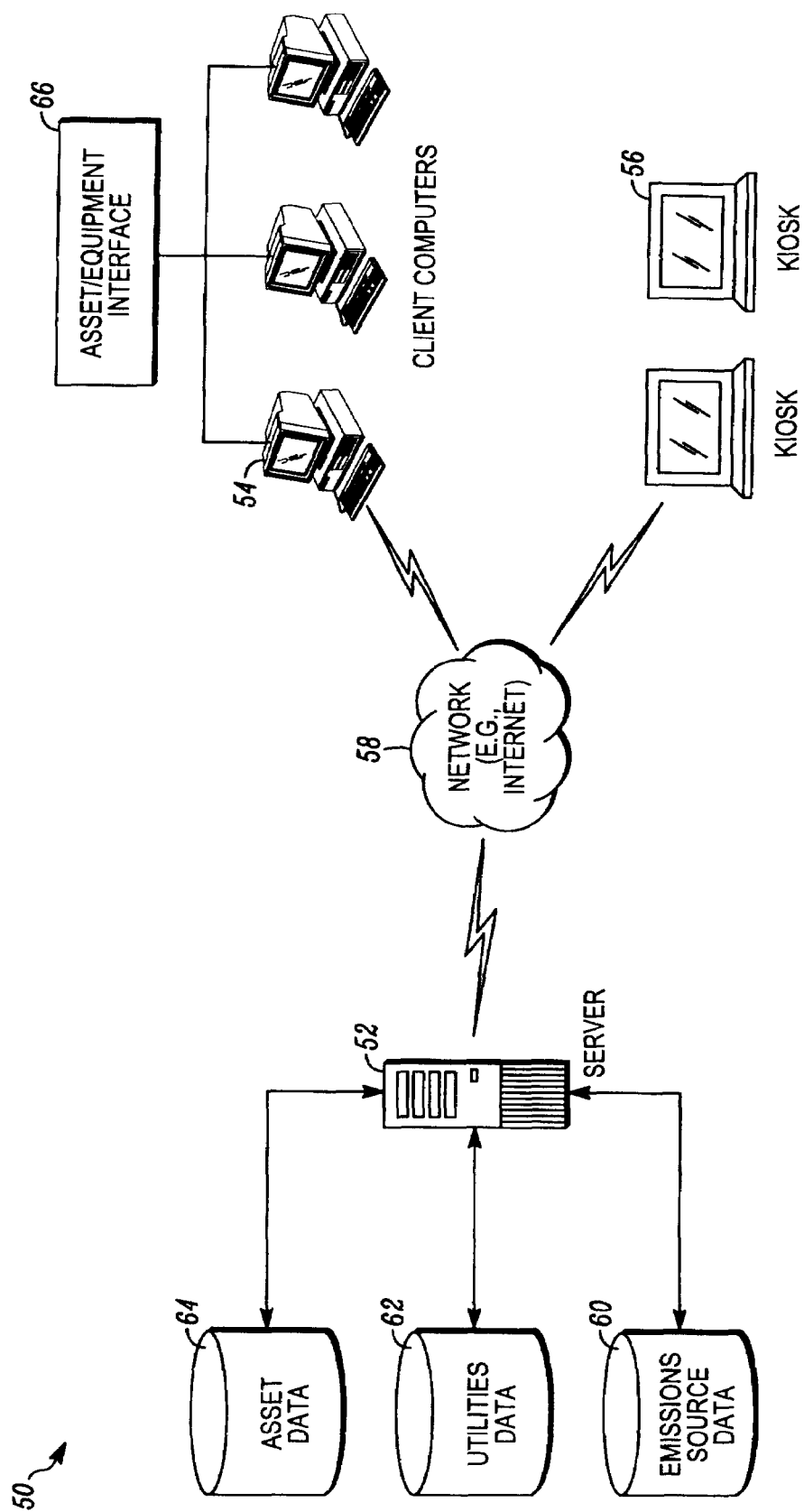
FIG. 3 is a block diagram of an emissions tracking system configuration, in accordance with one embodiment.

In one embodiment, an implementation of the system described herein is operated in a similar fashion to, or in conjunction with, a enterprise asset management system for managing the assets, including the emissions sources, of a distributed enterprise. One example of such a system is disclosed in co-pending U.S. patent application Ser. No. 09/883,779, entitled "Method and System for Managing Enterprise Assets," filed on Jun. 18, 2001, which is incorporated herein by reference in its entirety. FIG. 3 is a schematic diagram showing a network-based emissions tracking system 50 according to a second embodiment. As shown in FIG. 3, the system 50 according to one embodiment can include a server 52 in communication with client computers 54 and/or kiosks 56 through a network 58. The client computers 54 and/or kiosks 56 can be located at each of the various distributed sites. "Client computers" as used herein shall mean any known type of processor or computer. The system 50 allows a distributed enterprise to monitor and track assets or equipment, emissions sources, and emissions at multiple sites.

As further shown in FIG. 3, in one embodiment, the server 52 is in communication with an emissions source database 60 and a utilities database 62. According to an alternative embodiment, the server 52 is also in communication with an additional asset or equipment database 64 that stores data relating to assets or equipment that are not emissions sources or data relating to all assets or equipment that is unrelated to emissions. Alternatively, the emissions source data, utilities data, and alternative asset or equipment data are maintained in a single database.

The client computers 54 are in communication with individual pieces of equipment such as emissions sources through an asset/equipment interface 66. In some embodiments, equipment interfaces 66 are attached to direct emission sources with communications capabilities in order to monitor the emissions production of the direct emission source. The equipment interface 66 can be configured to communicate with the equipment and to provide a communication link between the equipment and a enterprise processor 54 or the central processor 52.

In one embodiment, this interface 66 is configured to accept input from emissions sensors. According to one implementation, the interface 66 is a local area wired or wireless network. In one aspect, the interface 66 includes software to translate and normalize signals received from various types of equipment, similar to that disclosed in co-pending U.S. patent application Ser. No. 10/734,725, filed on Dec. 12, 2003, which is hereby incorporated herein by reference in its entirety. In one exemplary embodiment, the equipment interface to an emission sensor is an interface with a continuous emissions monitoring system such as the Baldwin™ Series Classic Thermo-Electric Cooler, available from Perma Pure LLC, located in Toms River, N.J.

In one aspect of the invention, an interface 66 associated with a particular piece of equipment such as, for example, a direct emissions source, allows for collection of information, including real-time information, directly from the piece of equipment. Further, the information collected from the asset or piece of equipment can then be used in the present system in any fashion taught herein. In one example, given that the method and system of tracking, calculating, and reporting emissions described herein provides for tracking and calculating emissions of any given asset, the information collected by the appropriate interface 66 can be used to calculate emissions of the piece of equipment, the site, or the enterprise, according to one embodiment.

In the system 50, generally, emissions data entered into the system 50 via a client computer or processor 54 and/or equipment interface 66 is received by the server 52 and stored in the emissions source database 60.

The information relating to emission sources, according to one embodiment, can be organized within the emission source database 60 or retrieved from the database 60 according to source, according to site, or any other desired parameter. That is, the information can be stored or retrieved on a per-site basis, a per-asset basis, or any other basis. For example, organizing information on a per-site basis allows for consideration of all emission information at a site and processing of that information for purposes described herein. Alternatively, organizing the information on a per-source basis is also useful as described herein.

The server or central processor 52 can be any computer known to those skilled in the art. In one embodiment, the central processor 52 includes a website hosted in at least one or more computer servers. These servers may comprise web servers, database servers and/or application servers, which may run on a variety of platforms.

In one implementation, the central processor 52 includes software programs or instructions that run on the server-side to process requests and responses from an enterprise processor 54. These software programs or instructions send information to the enterprise processor 54, perform compilation and storage functions, and generate reports. According to one embodiment, the software programs or instructions are configured to perform the appropriate emissions calculations as described below. The software may be software applications commercially sold and normally used by those skilled in the art or they may be specific applications coded in a standard programming language.

The central processor 52 allows access by the enterprise processor 54 to various network resources. In one embodiment, the central processor 52 also has access, via the network 58 or some other communication link, to external data sources that may be used to keep the information in the server current. In one implementation, a number of enterprise processors 54 may be connected to the server at any given time, and therefore a number of an enterprise's facilities or locations may utilize the system simultaneously.

According to one embodiment, the databases 60, 62, 64 may be of any type generally known in the art. The databases 60, 62, 64 may be integral to the central processor 52 or they may be accessible to the central processor 52 through a computer network or other suitable communication link. In one embodiment, the databases 60, 62, 64 are comprised of a plurality of database servers, some of which are integral to the central processor 52, and some that are located remotely from the central processor 52.

It is further understood that the client computers or enterprise processors 54 may be any computer or computer systems used by those skilled in the art. Such enterprise processor 54 comprises a central processor unit ("CPU") and main memory, an input/output interface for communicating with various databases, files, programs, and networks (such as the Internet), and one or more storage devices. The storage devices may be disk drive devices or CD-ROM devices. The enterprise processor 54 may also have a monitor or other screen device and an input device, such as a keyboard, a mouse, or a touch sensitive screen.

Generally, the emissions source database 60 includes any emission source information relating to the enterprise's emission sources, as described above. For example, the emission source information may include the emission source identifying information, historical emissions data, site information, and, in some embodiments, group information. Alternatively, the database 60 can include any emission source information of any kind.

Figure 4:
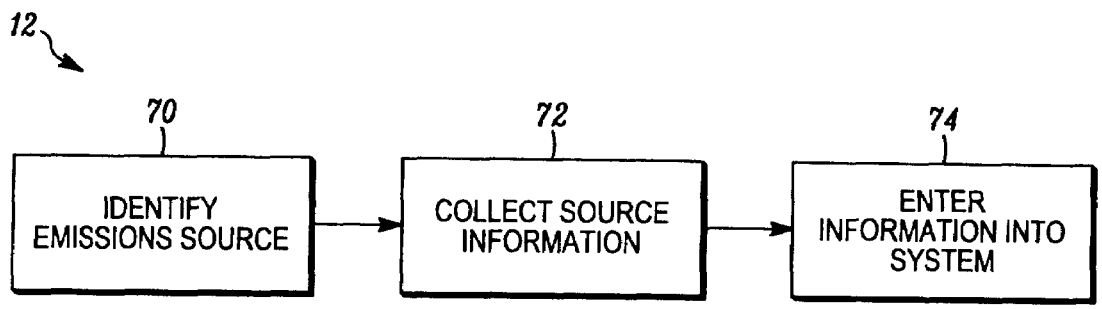
FIG. 4 is a flow chart illustrating the collecting and entering of emissions information into an emissions tracking system, in accordance with one embodiment.

As discussed above, according to one embodiment, emissions data can be collected and entered into the system (block 12). According to one embodiment, the system can store the emissions data in the emissions database 60. In one aspect, the emissions data includes information relating to the amount of emissions produced by an emission source. FIG. 4 is a flow chart illustrating the process of collecting and entering emissions data 12, according to certain embodiments. As shown in FIG. 4, in certain embodiments, a user identifies an emission source for which information is to be collected (block 70). Alternatively, there is no need to identify the emission sources because information is collected for all sources at a location. In some embodiments, based on the type of emissions source identified, information corresponding to the identified source is collected (block 72). After emission source information is gathered, the information is input into the system and associated with the appropriate emission source (block 74). In one embodiment, the emissions information is collected and/or entered into the system on a periodic basis.

The user, according to one embodiment, is an agent or employee of the enterprise. Alternatively, the user can be anyone with access to the system via a client computer 54.

It is understood that any relevant emissions source information can be collected. In one embodiment, the method of emissions information collection (block 72) and the type of information collected can depend on the type of emissions source. That is, different types of emissions sources may call for different information and different collection methods. For example, direct emissions source information is collected in a different fashion than indirect emissions source information.

Returning to FIG. 4, one general method of collecting indirect or direct emissions (block 72), according to one embodiment, includes collecting usage information. In the case of indirect emissions sources such as utilities, the utility provider provides to the enterprise an invoice relating to the utility usage by the enterprise or by one particular location of the enterprise. Thus, the collection of usage information relating to such an indirect emissions source includes collecting the invoice information (block 72). According to one embodiment, the invoice information is collected by simply receiving a hardcopy of the invoice, for example by receiving the hardcopy in the U.S. mail. Alternatively, the invoice information is collected in an electronic format via an e-mail or other electronic form of communication, including at a website. In one example, the information of interest includes the total utility usage.

Alternatively, the usage information can be collected via an interface similar to the interface 66 described above with respect to FIG. 3. In this embodiment, the interface is coupled to an energy meter (such as, for example, an electric meter or a gas meter) to collect all usage information based on the meter. One example of such an interface is the Data Manager™ available from Resource Data Management in Glasgow, Scotland.

For direct emissions sources, according to one embodiment, the emissions source information can include total usage of the source during a given period. Thus, the collection of information for direct emissions sources can also include the collection of usage information (block 72). For example, the direct emissions source can be a mobile combustion unit such as a vehicle, and the source information of interest can include the total fuel usage during the period. In one aspect, the usage information is collected by manually collecting all fuel invoices associated with the source. Alternatively, the fuel invoice information is collected in an electronic format via an e-mail or other electronic form of communication, including at a website.

Figure 5:
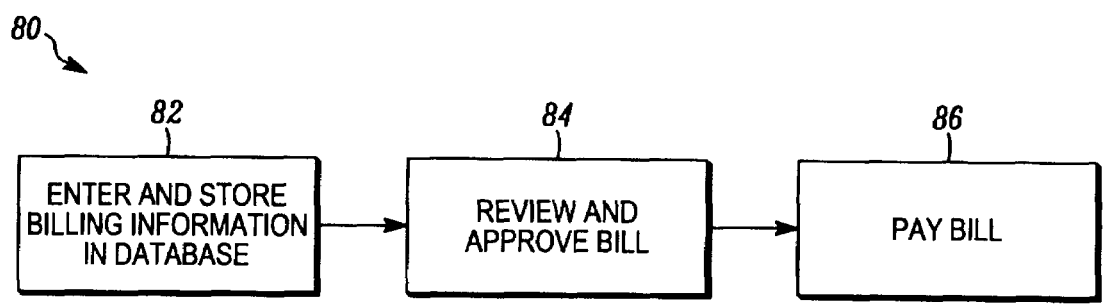
FIG. 5 is a flow chart illustrating a method of managing an invoice, according to one embodiment.

In one aspect of the systems and methods disclosed herein, any invoices or billing information can be managed and entered or processed via a method or system similar to, or in cooperation with, one of the methods or systems disclosed in co-pending U.S. application Ser. No. 11/423,860, filed on Jun. 13, 2006, which is hereby incorporated herein by reference in its entirety. FIG. 5 depicts one embodiment of a method for processing bills or invoices 80, in which the system 80 allows for entry and storage in a database of billing information at each site for each emissions source or utility provider (block 82). The system further provides for review and approval of each bill (block 84) and for payment of each bill (block 86), including, in certain embodiments, payment using an electronic payment system.

As disclosed in that application, the billing information for entry and storage (block 82) can include, but is not limited to, all the information provided in each periodic bill or invoice associated with any emissions source, such as a fuel bill relating to a direct emissions source or a bill from a utility provider. For example, the billing information can include all fuel bills or other invoice information for any enterprise site relating to the operation of one or more direct emissions sources and/or all invoice information for any enterprise site provided separately by one or more of the gas provider, electricity provider, or any other utility or energy provider that results in the emission of GHGs. In one embodiment, the billing or invoice information is entered manually by a user, such as an employee of the enterprise or an employee of the utility provider, at a client computer or kiosk or other entry point.

Alternatively, the information is entered electronically. For example, electronic entry can be accomplished by scanning a document with any known scanner utilizing OCR or any other scanning technology and loading the scanned information into the system. In another example, the information is entered electronically by direct electronic communication between the billing system of the provider of the invoice and a system as described herein over the network similar to the network described in FIG. 3. In a further alternative, the billing information is electronically compiled by an external individual or individuals, such as, for example, a third-party entity hired to compile the billing information into a format that can be easily loaded into the system and then the billing information is loaded into the system. According to one embodiment, the third-party individual or individuals compile historical billing information into an appropriate format for loading into the system. Alternatively, the third-party individual or individuals compile current billing information on an on-going basis for loading into the system. In a further alternative, both historical and current billing information are compiled into an appropriate format by the third party individual or individuals or by an employee or agent of the enterprise.

For purposes of both direct and indirect emissions tracking, in addition to usage information and any other information relating to the amount of emissions a source has produced, the user may enter any other relevant information (block 72), including but not limited to, the site where the emission source is located, the group that the emission source is a part of, if any, and the date the information was gathered.

In one embodiment, the indirect emissions source is electricity. In another embodiment, the indirect emissions source can be imported steam, imported heating, imported cooling, or any other imported energy source that results in the emission of any GHGs. In one embodiment, the information gathered includes the total energy consumption of the source. For example, if the indirect emissions source is electricity, the information to be collected can include the total electricity consumption for some period in kilowatt hours. As discussed above, this information can be collected or calculated from the electricity invoice. In another example, the indirect emissions source is imported steam, heating, or cooling. In this example, the information to be collected can include, but is not limited to, the total steam, heating, or cooling consumption for some period in any appropriate unit of measure.

In one embodiment, the direct emissions source is a mobile combustion source. In another embodiment, the direct emissions source can be a stationary combustion source, a power plant, a manufacturing plant, or any other type of plant, asset, or equipment used at an enterprise location that emits any kind of GHGs at the location. In one embodiment, the information gathered includes the total energy consumption of the source. For example, if the direct emissions source is a mobile combustion source, the information to be collected can include any or all of the make and model of the source, the type of fuel consumed by the source, the total fuel consumption of the source, and the distance traveled by the source. As discussed above, this information can be collected or calculated from any or all of the fuel invoice(s), fuel purchase records, odometer readings, trip manifests, and/or maintenance records. In another example, the direct emissions source is a co-generation plant as described above and the emissions source information that is collected can include the fuel input, electricity production, net heat production, and/or plant efficiency. In a further example, the direct emissions source is a stationary combustion source, and the source information that is collected may include the type of fuel consumed by the source and the total fuel consumption of the source. This information can also be obtained from utility bills, according to one embodiment.

In another embodiment, the direct emissions source is a manufacturing process emission source, and the source information that can be collected includes total emissions of any measurable gas of interest in any appropriate unit of measure, including, for example, those gases and units of measure set forth in EPA rules and government legislation.

According to one embodiment, the timing of the emissions information collection (block 72) and the number of such collections can vary significantly. That is, the collection can be performed daily, weekly, monthly, yearly, or at any other known interval. Alternatively, the collection can be performed randomly. It is also understood that the number of data points collected can vary significantly. That is, the emissions information can be based in one embodiment on only one invoice for a broad emissions source category. Alternatively, the information can be based on one invoice for a subcategory of emissions sources. In a further alternative, each emissions source is monitored individually by a user or dedicated interface or sensor.

In another embodiment, fugitive emissions can also be tracked. The fugitive emissions source can be any of a number of assets or equipment that leaks any GHG. In one example, the fugitive emissions source is refrigeration equipment, and the source information that can be collected includes the equipment type, the actual and/or calculated leak rate, and/or the quantity and type of refrigerant used.

According to one embodiment, the tracking and management of fugitive emissions can be performed via a method and system similar to that described in co-pending U.S. application Ser. No. 10/429,619, filed on May 5, 2003, which is hereby incorporated herein by reference in its entirety. The application discloses tracking and management of fugitive emissions such as refrigerant leakage, and it is understood that the teachings can apply to any type of fugitive emissions.

For either or both of direct and indirect emissions tracking, the emissions source information is then entered into the system (block 74). In one implementation, the information is manually entered by a user. For example, a user could enter the information from a hardcopy invoice into the system using a client computer. Alternatively, the information is automatically entered into the system. For example, the information is provided in electronic format and is automatically loaded into the system upon receipt or retrieval from the provider of the invoice.

In an alternative embodiment, any emission source information can be entered into the system via an equipment interface similar to the interface discussed above with respect to FIG. 3. The equipment interface allows the system to automatically track information related to the amount of emissions produced by a certain emission source without any manual input or effort by a user. For example, a stationary combustion source, such as a smokestack, may be equipped with an equipment interface that continuously measures the amount of emissions produced by the source and is equipped with a communication link between the source and the central processor. Any information received by the central processor from the equipment interface may then be stored in the database.

In a particular embodiment, the system saves into an emissions database, such as a database similar to the one discussed above with respect to FIG. 3, all of the information gathered such that the system accumulates all of the information relating to the amount of emissions produced by each emission source.

Returning to FIG. 1, certain embodiments of the method of tracking emissions include calculating the amount of emissions produced by an emission source or sources (block 14). That is, the amount of emissions produced, particularly the amount of greenhouse gas emissions, and more particularly the amount of $CO_2$ and $CO_2$ equivalents, produced by a particular source or group of sources can be calculated for any desired time period. In certain embodiments, the system calculates the emissions produced by an entire site and/or the entire enterprise. In other embodiments, the system automatically performs calculations and or reports emission totals at recurring predetermined intervals, such as every month or every year.

In one aspect, the amount of emissions is calculated in the system by inputting into an appropriate equation emissions information stored in the database and emission factors appropriate to the source for which an emission production amount is to be calculated. For purposes of the present application, "emission factors" are representative values that relate the quantity of emissions released to the atmosphere with an activity associated with the release of emissions. These factors are expressed as the weight of emission (typically Metric Ton of $CO_2$ divided by a unit weight, volume, distance, or duration of the activity producing the emission). Emission factors are made available through various governmental agencies, such as, for example, the Intergovernmental Panel on Climate Change ("IPCC") or Environmental Protection Agency. Because the emission factors fluctuate, in some embodiments, they are updated on a periodic basis.

One example of an emissions factor is the factor associated with indirect emission sources, such as those sources provided by utilities. One common term for such a factor is the "eGRID factor." This factor is assigned to an energy provider or utility based on the emissions created by the provider, which is influenced by the sources of the energy. For example, an electricity provider that utilizes solely coal plants to generate electricity would generate significantly more emissions than a provider that utilizes solely windmills to generate electricity, and thus the factor assigned to each would reflect that difference in emissions. Thus, an emissions factor would be included in any calculation relating to an indirect emissions source.

In a further example of an emissions factor, if the emission source is a co-generation plant or system utilized by a third party energy or utility provider (and thus is an indirect emissions source), one emission factor of note relates to the calculation of emissions of the enterprise relating to energy acquired from a third party provider using such a co-generation plant or system. That is, a co-generation plant or system's simultaneous generation of power and useful heat creates a need for a factor or formula that accounts for such simultaneous generation and provides a relatively accurate estimate of the emissions associated with energy utilized by the enterprise. According to one implementation, one such calculation is the coefficient of performance, which reflects the relationship of useful heat generated by a co-generation plant or system to the power consumed to generate that heat. The equation for this particular coefficient can be expressed as follows:

$$COP_{max} = \left(\frac{Q_{low}}{Q_{high} - Q_{Low}}\right)_{max} = \frac{Q_{low}}{Q_{low}\frac{T_{high}}{T_{low}} - Q_{low}} = \frac{T_{low}}{T_{high} - T_{low}}$$

According to one embodiment, the amount of emissions produced is calculated in the system using the following general equation:

Emissions Produced=Emission Activity [weight, volume, distance, or duration]×Emission Factor [Metric Ton $CO_2$/(weight, volume, distance, or duration)]

That is, the processor, according to one embodiment, performs the calculation based on the above equation to determine the amount of emissions produced by a particular emissions source.

For example, if the emission source is purchased electricity, the amount of $CO_2$ produced is calculated by the system using the following equation: Emissions Produced=Electricity consumed [kWh]×Emission Factor [Metric Ton $CO_2$/kWh].

As another example, if the emission source is an stationary combustion source that consumes natural gas, the amount of $CO_2$ produced is calculated by the system using the following equation: Emissions Produced=Natural gas consumed [Therms]×Emission Factor [Metric Ton $CO_2$/Therm].

Further emissions totals can be calculated by the system using any of the equations and factors provided in the GHG protocol by the World Resources Institute (www.ghgprotocol.org), which is hereby incorporated herein by reference in its entirety. Plus, further calculations, equations, and emissions factors relating to GHG emissions are set forth in the California Climate Action Registry General Reporting Protocol, Version 2.1, published in June, 2006, which is hereby incorporated herein by reference in its entirety. In addition, the emissions totals can be attained using any known equations or calculations for determining emissions, any or all of which can be integrated into the software of the system. For example, according to one embodiment, the calculations and equations are integrated into the software of a central processor similar to the central processor described with respect to FIG. 3.

In accordance with another embodiment, a method and system for tracking and/or reporting emissions can include tracking the emission of $CH_4$ and/or $N_2O$ from an emission source. In a further embodiment, the method or system can include converting the $CH_4$ and/or $N_2O$ emissions into "$CO_2$ equivalents." According to one embodiment, the conversion is accomplished on the basis of the respective global warming potentials ("GWPs") of the $CH_4$ and/or $N_2O$ emissions. "GWPs," as used herein, are representative values used to compare the abilities of different greenhouse gases to trap heat in the atmosphere. The GWP values provide a construct for converting emissions of various gases into a common measure denominated in $CO_2$ equivalent ("$CO_2e$") and is provided by the IPCC. According to one embodiment, the server of the system performs the conversion based on the above construct.

In one embodiment, the conversion equation is set forth as follows:

Metric Tons of $CO_2$e=Metric Tons of Non-$CO_2$e GHG×GWP.

The 1996 and 2001 GWP numbers are set forth in Table 1, which was published in the California Climate Action Registry General Reporting Protocol, discussed and incorporated above.

TABLE 1

| Greenhouse Gas | GWP (SAR, 1996) | GWP (TAR, 2001) |
|---|---|---|
| $CO_2$ | 1 | 1 |
| $CH_4$ | 21 | 23 |
| $N_2O$ | 310 | 296 |
| HFC-123 | 11,700 | 12,000 |
| HFC-125 | 2,800 | 3,400 |
| HFC-134a | 1,300 | 1,300 |
| HFC-143a | 3,800 | 4,300 |
| HFC-152a | 140 | 120 |
| HFC-227ea | 2,900 | 3,500 |
| HFC-236fa | 6,300 | 9,400 |
| HFC-43-10mee | 1,300 | 1,500 |
| CF4 | 6,500 | 5,700 |
| C2F6 | 9,200 | 11,900 |
| C3F8 | 7,000 | 8,600 |
| C4F10 | 7,000 | 8,600 |
| C5F12 | 7,500 | 8,900 |
| C6F14 | 7,400 | 9,000 |
| SF6 | 23,900 | 22,000 |

Source: U.S. Environmental Protection Agency, U.S. Greenhouse Gas Emissions and Sinks: 1990-2000 (April 2002).

It is understood that the GWP values are merely one estimate to capture the ability of each GHG to trap heat and are occasionally modified by the IPCC. In alternative embodiments, other measures and other calculations could be used to calculate $CO_2$ equivalents or other types of equivalents. In a further embodiment, emissions can be measured and tracked without calculating any equivalents.

In accordance with a further implementation, certain systems and methods described herein can provide for tracking and managing tradable credits relating to greenhouse gases, including carbon credits. "Carbon credits," as used herein, shall mean any tradable commodity that assigns a value to GHG emissions. It is understood that there are currently two exchanges for carbon credits: the Chicago Climate Exchange and the European Climate Exchange. It is further understood that certain quotas have been established by the Kyoto Protocol and countries around the world relating to the amount of GHG emissions that countries and businesses can produce, and that each business can compare its emissions to its quota to determine whether it has a credit surplus (because its emissions were below its quota) or it has a credit debt (because its emissions exceeded its quota), and act accordingly.

Figure 6:
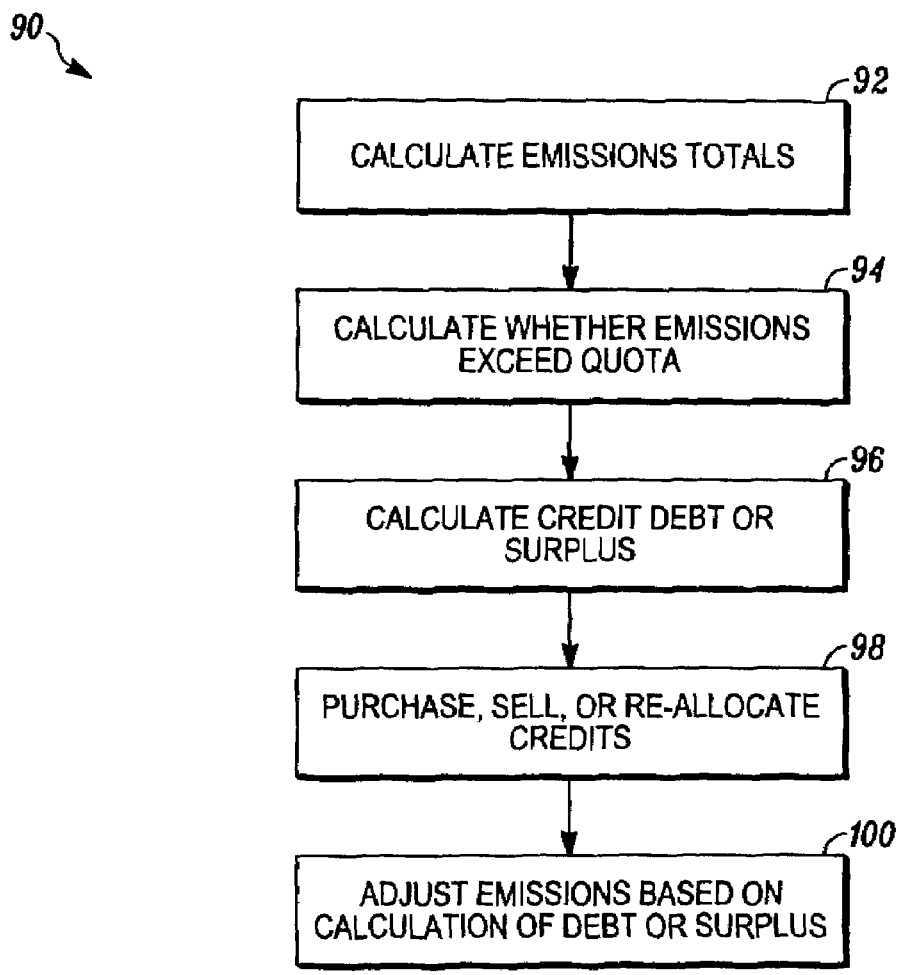
FIG. 6 is a flow chart illustrating a method of tracking and managing carbon credits, according to one embodiment.

According to one embodiment, one method and system of tracking and managing carbon credits for an enterprise 90 is set forth in FIG. 6. It is understood that this method and system can be performed on the basis of a site or an entire enterprise. Alternatively, the method and system can be performed on the basis of a grouping of sites, such as all the sites in a particular state or region. It is also understood that the methods and systems described herein are not limited to tracking and/or management of carbon credits or the climate exchanges described above and can be used to track and manage any type of tradable credit relating to GHG emissions.

First, as set forth in FIG. 6, the system provides for calculating the emissions totals (block 92) in a fashion similar to the emissions calculations provided with respect to block 14 in FIG. 1 and discussed above. Then, the system provides for comparing the emissions totals to the predetermined quota for the site or enterprise (or other measure, as discussed above) and calculating whether the emissions for that site or enterprise exceed the quota (block 94). Based on this calculation, the system or method provides for calculating the carbon credit debt or surplus (block 96). That is, if the site or enterprise has exceeded its emissions quota, then it has a carbon credit debt. In contrast, if the site or enterprise has emitted less than its quota, then it has a carbon credit surplus.

According to one embodiment, the system 90 then allows for the purchase, sale, or reallocation of credits (block 98) depending on whether there is a surplus or debt. That is, if there is a credit debt, the system calculates the number of credits that must be purchased to eliminate the debt. In one implementation, the system is connected via a network connection or other communication link to an external source that provides the current market price for a credit and utilizes that information to calculate the cost of purchasing the required credits. In another embodiment, the system provides for or automatically performs a purchase of the required credits.

If there is a credit surplus, the system 90 calculates the credit surplus (the number of credits that the site or enterprise has to spare because it did not exceed its emissions quota). In another embodiment, the system 90 also utilizes the communication link to calculate the value of the surplus credits. In another embodiment, the system provides for or automatically performs a sale of the surplus credits.

Alternatively, in an embodiment in which the system 90 calculates a credit surplus at one or more sites of an enterprise and further calculates a credit debt at one or more other sites of the enterprise, the system can provide for calculating each of the surpluses and the debts and reallocating the credits from the surplus sites to the debt sites, thereby eliminating at least a portion of the need to purchase additional credits on the market.

In a further alternative step, the system 90 also can provide for the adjustment of current or future emissions based on the calculations of a credit debt or credit surplus (block 100). Such adjustment can be implemented with the predictive capabilities discussed below.

In one aspect, a processor in the system 90 has software configured to perform the above comparisons and calculations.

In another embodiment, certain systems and methods described herein can provide for predictive analysis and preventative planning based on the emissions information and calculations described above, including predictive analysis and planning and/or adjustment of emissions based on the calculations of credit surplus or debt as described above. In one embodiment, such a system or method is similar to or operated in conjunction with one of the systems and methods providing predictive analysis and preventative planning as described in U.S. application Ser. No. 11/423,860, which is discussed and incorporated by reference above. Such a system or method could include software that draws upon the calculations discussed above to predict future trends in the data. The enterprise or a user can then utilize a predicted trend and the above information to take appropriate steps to address any predicted impact of the trend. According to one exemplary embodiment, predicted weather patterns can be used to predict a trend in energy use and thus GHG emissions. For example, perhaps a particularly cold winter has been predicted. The system according to one embodiment, can compare the predicted winter season with past correlations and/or calculated correlations between similar winter seasons and GHG emissions. Based on the correlations, the system can predict the impact of the cold winter season on the amount of GHG emissions for a site or a group of sites in the region impacted by the cold weather.

In another exemplary embodiment in which each site has been mapped with GIS capabilities as disclosed in U.S. application Ser. No. 10/771,090, which is incorporated herein by reference in its entirety, the system can compare a predicted path of a weather event (such as a cold snap or heat wave, etc.) with site locations using a map-based interface and identify the sites of the enterprise predicted to be directly affected by the weather. The system can further calculate and/or notify a user or users of the predicted GHG emissions. In another exemplary embodiment, a predicted temperature spike across a certain region can be used to predict expected GHG emissions relating to electricity, etc.

According to one embodiment, preventative action can then be taken by the user or the enterprise based on the predicted information provided by the system. In one embodiment, the user takes action based on the predicted information provided by the system. In the example of the predicted winter season, the user can take such steps as reducing energy consumption and thereby reducing emissions at unaffected sites in anticipation of increased emissions at the affected sites, or any other appropriate action to prepare for the expected increase in emissions.

Alternatively, the preventative action is implemented by the system. That is, the system allows for data and predictive analysis, including predicting certain trends relating to certain assets or equipment, and upon the triggering of a certain event associated with those predictions, electronically communicating or transmitting operating instructions to the relevant piece of equipment via the asset/equipment interface associated with that piece of equipment, similar to that described above with respect to FIG. 3. Thus, the asset/equipment interface capabilities can be used in conjunction with the data and predictive analysis capabilities as described above to provide for preventative action or action to address the impact of a predicted trend.

In one embodiment, the asset/equipment interface capabilities can be utilized to remotely control operating parameters of certain energy or energy-related systems at a site, as disclosed in further detail in U.S. application Ser. No. 10/734,725, which is mentioned and incorporated by reference above, to accomplish measures intended to prevent or reduce any negative impact of predicted phenomenon as described above. Thus, the system according to one embodiment allows for tracking various parameters relating to equipment at a site or multiple sites, performing data and predictive analysis, and upon the triggering of a certain event or predicted event associated with those parameters, electronically communicating or transmitting operating instructions to the equipment to thereby impact GHG emissions in some way. According to one embodiment, the types of equipment that can be remotely controlled in this fashion include, but are not limited to, refrigeration, lighting, and HVAC equipment and systems, or any other GHG emitting equipment of any kind.

In the example of the predicted cold winter season, the predicted cold temperatures can trigger the system to electronically communicate instructions to the HVAC systems and, in some embodiments, additional power consuming systems of unaffected sites to reduce power output of those systems, thereby reducing the GHG emissions associated with that equipment, which, in some embodiments, allows the enterprise to conserve GHG credits in any GHG credit market that may be established by an organization or government such as the carbon credit market described above. In the example of the predicted temperature spike, the predicted high temperatures could trigger the system to electronically communicate instructions to the HVAC systems of unaffected sites to reduce power output of those systems, thereby reducing the GHG emissions at those sites and, in some embodiments, conserving the enterprise's GHG credits to compensate for the increased emissions at the affected sites.

In either of the above examples, the instructions transmitted by the system can be further impacted by the system's consideration and analysis of the market demand information and GHG credit rate information in addition to the predicted weather trends. According to one embodiment, the predicted weather pattern results in a predicted demand and/or GHG credit rate that triggers instructions transmitted by the system to the relevant equipment through the appropriate interface or interfaces based on the predicted rate. Alternatively, real-time or nearly real-time rate information can be inputted into the system of the present embodiment and based on the GHG credit rate, the system can be triggered to transmit various instructions from the system to the relevant equipment through the appropriate interface or interfaces. For example, in the cold temperature example above, the server software may predict a certain GHG credit rate that triggers an electronic instruction to be transmitted to the equipment at the affected site or sites instructing the HVAC systems to reduce output by some predetermined percentage during the predicted peak rate period(s) to reduce emissions and thus the expense of the GHG credits required for those emissions. Thus, the market demand and GHG credit rate information can be taken into account in providing instructions to the relevant equipment and/or sites. In a further alternative, the system can be triggered by any number of different parameters to communicate with various equipment to implement preventative or remedial actions in response to a predicted trend.

According to one embodiment, the method and/or system can generate emission reports (block 16 of FIG. 1). Generally, an emission report can include any desired information about an identified emission source or group of emission sources, including without limitation, the emission source identifier, the type and/or subtype, the site location, and the total amount of emissions produced. According to one embodiment, the total amount of emissions includes the amount of GHGs produced. Alternatively, the total amount of emissions includes the amount of $CO_2$ and $CO_2e$ produced, expressed in metric tons of carbon dioxide.

Figure 7:
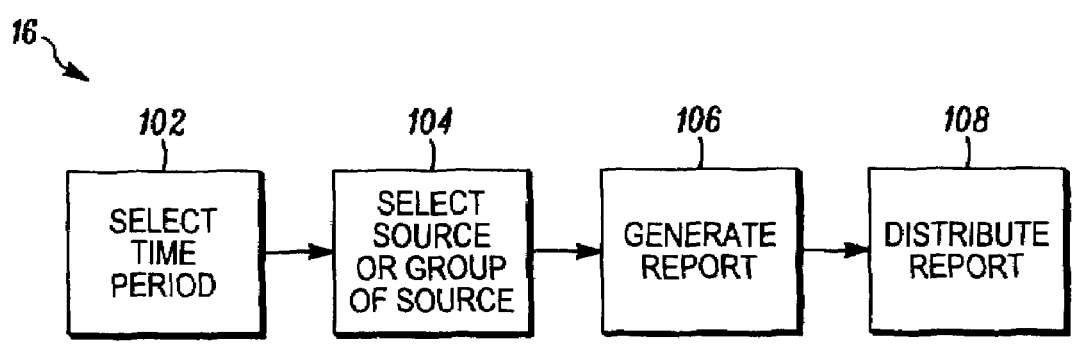
FIG. 7 is a flow chart illustrating the generating of an emission report, according to one embodiment.

FIG. 7 depicts one method of generating an emissions report 16, according to one implementation. This particular method includes selecting a time period over which emissions production is to be calculated (block 102), selecting a particular emission source or group of emission sources for which emission production is to be calculated (block 104), generating an emission report on the basis of the selected time period and selected emission sources (block 106), and making the report available for dissemination (block 108).

A report may be requested for any time period (block 102), according to one embodiment. For example, an emissions report may be requested for the amount of emissions produced in the preceding day, week, month, or year. Alternatively, a report may be requested for any time period.

A report may also be requested for any emissions source or any group of emissions sources (block 104), according to one implementation. For example, in some embodiments, a report request may be made for all of an enterprise's emission sources. Alternatively, a report request may be made on the basis of site location, source type or subtype, or any combination thereof.

Typically, a report request is initiated by a user located at a remote site through the use of an enterprise processor or client computer similar to those in FIG. 3. Alternatively, the request can be initiated by anyone with access to the system. For example, the request could be requested by any user with access to the system over the internet.

Upon initiation, according to one embodiment, the server utilizes the parameters provided by the user to retrieve the appropriate information from emissions source database and generate the report (block 106). Subsequently, the emissions report can be made available for dissemination (block 108). In some embodiments, the report is only made available for dissemination within the enterprise internally. For example, the report may be automatically distributed to predetermined recipients within the enterprise. Alternatively, the report may, in accordance with applicable laws and regulations, be made available for dissemination to individuals or entities external to the enterprise, such as, for example, local, state, or federal governmental agencies. In one embodiment, the report is generated and distributed in hardcopy. Alternatively, the report is generated and distributed electronically, such as via e-mail or a webpage. In a further alternative, the report can be generated in any known form and any known fashion.

Although certain inventions have been described herein with reference to preferred embodiments, persons skilled in the art will recognize that changes may be made in form and detail without departing from the spirit and scope of those inventions.

What is claimed is:

1. A network-based emissions tracking system for an enterprise, the system comprising:
   (a) a central processor accessible on a computer network;
   (b) an asset database in communication with the central processor, the asset database configured to store:
      (i) asset information relating to a plurality of assets at a plurality of sites, wherein the plurality of assets comprises at least one emissions asset;
      (ii) usage information relating to each of the at least one emissions assets; and
      (iii) carbon credit information relating to each of the at least one emissions assets;
   (c) a client processor in communication with the central processor, the client processor configured to allow for inputting any portion of the asset information, the usage information, and the carbon credit information;

(d) emissions tracking software associated with the central processor, the emissions tracking software configured to calculate and track a calculated greenhouse gas emissions amount relating to at least one of the at least one emissions assets based on the usage information relating to the at least one emissions asset; and (e) carbon credit tracking software associated with the central processor, the carbon credit tracking software configured to calculate and track the carbon credit information relating to at least one of the at least one emissions assets.

2. The system of claim 1, wherein the usage information comprises at least one of energy usage information from an energy meter, fuel consumption information, billing information, and energy consumption information.

3. The system of claim 1, wherein the emissions tracking software is further configured to calculate a total calculated greenhouse gas emissions amount for at least one of the plurality of sites based on the usage information relating to each of the at least one emissions assets at the at least one of the plurality of sites.

4. The system of claim 1, wherein the emissions tracking software is further configured to calculate a total calculated greenhouse gas emissions amount for the enterprise based on the usage information relating to each of the at least one emissions assets.

5. The system of claim 1, further comprising report software associated with the central processor, the report software configured to generate reports relating to the calculated greenhouse gas emissions amount.

6. The system of claim 1, wherein the client processor is further configured to allow for accessing, querying, downloading, and requesting information relating to any of the asset information, the usage information, and the carbon credit information.

7. The system of claim 1, wherein the carbon credit tracking software is configured to calculate and track the carbon credit information relating to at least one of the plurality of sites.

8. The system of claim 1, wherein the carbon credit tracking software is configured to calculate and track the carbon credit information relating to the enterprise.

9. The system of claim 1, further comprising at least one actual emissions sensor in communication with the central processor, wherein each of the at least one actual emissions sensors is operably associated with one of at least one direct emissions assets, the actual emissions sensor being configured to transmit actual emissions information relating to the at least one direct emissions asset to the central processor.

10. The system of claim 9, wherein the emissions tracking software is further configured to calculate and track an actual greenhouse gas emissions amount relating to at least one of the direct emissions assets based on the actual emissions information.

11. A network-based emissions tracking system for an enterprise, the system comprising:

(a) a central processor accessible on a computer network;
(b) an asset database in communication with the central processor, the asset database configured to store:
(i) asset information relating to a plurality of assets at a plurality of sites, wherein the plurality of assets comprises at least one emissions asset, wherein at least one of the at least one emissions assets is a direct emissions asset; and (ii) usage information relating to at least one of the at least one emissions assets;

(c) at least one actual emissions sensor in communication with the central processor, wherein each of the at least one actual emissions sensors is operably associated with one of the at least one direct emissions assets, the actual emissions sensor being configured to transmit actual emissions information relating to the at least one direct emissions asset to the asset database;

(d) a client processor in communication with the central processor, the client processor configured to allow for inputting to the asset database any portion of the asset information and the usage information; and (e) emissions tracking software associated with the central processor, the emissions tracking software configured to:
(i) calculate and track an actual greenhouse gas emissions amount relating to at least one of the direct emissions assets based on the actual emissions information; and
(ii) calculate and track a calculated greenhouse gas emissions amount relating to at least one of the emissions assets based on the usage information.

12. The system of claim 11, wherein the usage information comprises at least one of energy usage information from an energy meter, fuel consumption information, billing information, and energy consumption information.

13. The system of claim 11, wherein the emissions tracking software is further configured to calculate the calculated greenhouse gas emissions amount relating to the at least one of the emissions assets based on the usage information by inputting the usage information and an emission factor into an equation.

14. The system of claim 11, further comprising an electronic connection to a third party billing system, wherein the electronic connection is in communication with the central processor.

15. The system of claim 14, wherein the usage information comprises billing information relating to at least one of the emissions assets, wherein at least a portion of the billing information is received from the third party billing system via the electronic connection.

16. The system of claim 14, wherein the third party is an energy provider.

17. The system of claim 16, wherein the energy provider is a utility.

18. The system of claim 11, wherein the asset database is further configured to store billing information relating to each of the plurality of assets.

19. The system of claim 18, further comprising billing software configured to reconcile and pay a utility bill based on the asset information and the billing information.

20. The system of claim 11, wherein the asset database is further configured to store carbon credit information relating to at least one of the emissions assets.

21. The system of claim 20, further comprising carbon credit tracking software associated with the central processor, the carbon credit tracking software configured to calculate and track the carbon credit information relating to at least one of the emissions assets.

22. The system of claim 11, further comprising predictive analysis software associated with the central processor, the predictive analysis software configured to provide an estimated impact of a change in at least one external parameter on emissions of at least one emissions asset.

23. The system of claim 22, wherein the predictive analysis software is further configured to provide the estimated impact of the change in the at least one external parameter based on correlative analysis utilizing historical information.

24. The system of claim 22, wherein the predictive analysis software is further configured to identify at least one operating adjustment to at least one of the emissions assets in response to the estimated impact of the change.

25. The system of claim 24, further comprising an asset interface associated with at least one of the emissions assets, wherein the asset interface is in communication with the central processor, wherein the asset interface is configured to control at least a portion of the emissions asset.

26. The system of claim 25, further comprising operating software associated with the central processor, the operating software configured to adjust operation of at least one of the emissions assets through the asset interface associated with the at least one emissions asset based on the at least one operating adjustment.

27. The system of claim 11, wherein the client processor is further configured to allow for accessing, querying, downloading, and requesting information relating to any of the asset information and the usage information.

28. A network-based emissions tracking system for an enterprise, the system comprising:
  (a) a central processor accessible on a computer network;
  (b) an asset database in communication with the central processor, the asset database configured to store:
    (i) asset information relating to a plurality of assets at a plurality of sites, wherein the plurality of assets comprises at least one emissions asset;
    (ii) billing information relating to each of the plurality of assets;
    (iii) usage information relating to each of the at least one emissions assets; and
    (iv) carbon credit information relating to each of the at least one emissions assets;
  (c) billing software associated with the central processor, the billing software configured to reconcile and pay a utility bill based on the asset information and the billing information;
  (d) emissions tracking software associated with the central processor, the emissions tracking software configured to calculate and track a greenhouse gas emissions amount relating to at least one of the at least one emissions assets based on the usage information relating to the at least one emissions asset; and
  (e) carbon credit tracking software associated with the central processor, the carbon credit tracking software configured to calculate and track the carbon credit information relating to at least one of the at least one emissions assets.

29. The system of claim 28, wherein at least one of the at least one emissions assets is a direct emissions asset.

30. The system of claim 29, further comprising at least one actual emissions sensor in communication with the central processor, wherein each of the at least one actual emissions sensors is operably associated with one of the at least one direct emissions assets, the actual emissions sensor being configured to transmit actual emissions information relating to the at least one direct emissions asset to the central processor.

31. The system of claim 30, wherein the emissions tracking software is further configured to calculate and track an actual greenhouse gas emissions amount relating to at least one of the direct emissions assets based on the actual emissions information.

* * * * *

UNITED STATES PATENT AND TRADEMARK OFFICE
CERTIFICATE OF CORRECTION

PATENT NO. : 7,440,871 B2  Page 1 of 1
APPLICATION NO. : 11/744713
DATED : October 21, 2008
INVENTOR(S) : Robert S. McConnell et al.

It is certified that error appears in the above-identified patent and that said Letters Patent is hereby corrected as shown below:

Title Page
(75) Inventors: add --Daniel T. Johnson, Medina, MN--

Cross-Reference to Related Applications
Column 1, Line 15: Insert the following between "Jun. 13, 2006," and "continuation-in-part"
--which claims priority to U.S. Patent Application No. 60/444,091, filed January 31, 2003, entitled "Enterprise Energy Management," all of which are hereby incorporated herein by reference in their entireties. This application also is a--

Signed and Sealed this

Second Day of February, 2010

David J. Kappos
*Director of the United States Patent and Trademark Office*